(12) United States Patent
Dinkin et al.

(10) Patent No.: US 8,660,922 B2
(45) Date of Patent: Feb. 25, 2014

(54) METHODS, SYSTEMS, AND COMPUTER READABLE MEDIA FOR PEER-TO-PEER THIRD PARTY DISTRIBUTION OF GIFT CARDS AND PEER-TO-PEER TRANSACTION ROUTING THEREFOR

(76) Inventors: Gary T. Dinkin, Boca Raton, FL (US); Linda B. Dinkin, Boca Raton, FL (US)

( * ) Notice: Subject to any disclaimer, the term of this patent is extended or adjusted under 35 U.S.C. 154(b) by 909 days.

(21) Appl. No.: 12/183,431

(22) Filed: Jul. 31, 2008

(65) Prior Publication Data
US 2010/0030654 A1   Feb. 4, 2010

(51) Int. Cl.
*G06Q 40/00* (2012.01)

(52) U.S. Cl.
USPC .............................................. 705/35; 705/38

(58) Field of Classification Search
USPC .................................................... 705/35, 38
See application file for complete search history.

(56) References Cited

U.S. PATENT DOCUMENTS

| | | | | |
|---|---|---|---|---|
| 6,050,493 | A * | 4/2000 | Fertig | 235/487 |
| 6,189,787 | B1 * | 2/2001 | Dorf | 235/380 |
| 7,344,067 | B2 * | 3/2008 | Beck et al. | 235/380 |
| 7,458,509 | B2 | 12/2008 | Beck et al. | |
| 7,611,051 | B1 * | 11/2009 | Beck et al. | 235/380 |
| 2003/0028439 | A1 * | 2/2003 | Cox et al. | 705/26 |
| 2004/0181453 | A1 | 9/2004 | Ray et al. | |
| 2007/0175984 | A1 * | 8/2007 | Khandaker et al. | 235/380 |
| 2007/0187492 | A1 | 8/2007 | Graves et al. | |
| 2007/0272736 | A1 | 11/2007 | Brooks et al. | |

OTHER PUBLICATIONS

"inComm," http://web.incomm.com/, p. 1 (Copyright 2007).
"Leading the Way with Innovative Prepaid and Payments Products," Blackhawk Network, http://www.blackhawknetwork.com/, pp. 1-2 (Copyright 2006).
"InComm Secures Another Patent for Stored Value Card Transactions," InComm Press Release, retrieved from the World Wide Web on Jul. 21, 2009.
Meyer, "A Gift From Me to Your: Cross-Channel Gift Cards," Multichannel Merchant, http://multichannelmerchant.com/crosschannel/marketing/gift/index1.html (May 1, 2007).

* cited by examiner

*Primary Examiner* — Justin M Pats
*Assistant Examiner* — Benjamin S Fields
(74) *Attorney, Agent, or Firm* — Jenkins, Wilson, Taylor & Hunt, P.A.

(57) ABSTRACT

Methods, systems, and computer readable media for peer-to-peer third party distribution of gift cards and associated transaction processing are disclosed. In one method, a peer-to-peer gift card transaction router and a peer-to-peer gift card transaction database are configurable to facilitate peer-to-peer transaction processing for gift cards issued by a gift card provider and distributed by a third party seller where the gift card provider and the third party seller negotiate an agreement with each other regarding gift card distribution. A record is created in the database corresponding to the agreement. When a gift card transaction occurs, the record in the database is accessed and used to communicate notification of the gift card transaction from the gift card provider to the third party seller.

23 Claims, 3 Drawing Sheets

METHODS, SYSTEMS, AND COMPUTER READABLE MEDIA FOR PEER-TO-PEER THIRD PARTY DISTRIBUTION OF GIFT CARDS AND PEER-TO-PEER TRANSACTION ROUTING THEREFOR

TECHNICAL FIELD

The subject matter described herein relates to distribution of gift cards. More particularly, the subject matter described herein relates to methods, systems, and computer readable media for peer-to-peer third party distribution of gift cards and peer-to-peer transaction routing therefor.

BACKGROUND

Gift cards are cards that are redeemable for value to purchase goods or services from a specific source. An entity that issues gift cards to purchase its goods or services will be referred to herein as a gift card provider. An entity that sells gift cards will be referred to herein as a gift card seller. Currently, one of the most common methods for distributing gift cards involves the gift card provider and the gift card seller being the same entity. For example, a retailer that issues its own gift cards and sells the gift cards at the retailer's place of business is both a gift card provider and a gift card seller. The retailer can purchase a kit to issue its own gift cards or can have the gift cards made by a third party. The retailer is also required to have infrastructure for activating the gift card and redeeming the gift card for value.

Another method for distributing gift cards is third party distribution where a gift card provider provides its gift cards for sale via a third party seller's distribution channels. For example, a commercial airline may issue its gift cards and provide those gift cards for sale in a grocery store. In another third party gift card distribution example, a telecommunications service provider may provide prepaid phone cards for sale in a convenience store.

One advantage of third party distribution of gift cards is that the gift card provider increases its revenue from gift cards using the distribution channels of third party sellers. However, existing third party gift card distribution methods also have a number of disadvantages. For example, one conventional third party gift card distribution method involves an entity that will be referred to herein as a gift card distribution aggregator. A gift card distribution aggregator is a business entity that contracts with sellers to be on a list of potential gift card distribution channels for gift card providers. The gift card distribution aggregator then contracts with gift card providers for distribution of the providers' gift cards via sellers that have contracted with the gift card distribution aggregator. An example of an entity that currently exists and that is a gift card distribution aggregator is Blackhawk Network of Pleasanton, Calif.

Problems associated with distributing gift cards via gift card distribution aggregators, such as Blackhawk Network, include the fact that Blackhawk Network does not allow gift card providers and gift card sellers to negotiate with each other regarding the terms of gift card distribution. In addition, a gift card provider who wishes to distribute gift cards using the Blackhawk Network distribution system is required to select one of the sellers that has already contracted with Blackhawk Network and it is not free to select any seller of the gift card provider's choosing. Another problem associated with distributing gift cards via gift card distribution aggregators is that the aggregators do not offer real time settlement of gift card transactions between gift card providers and gift card sellers. A gift card provider whose gift cards are sold via a third party seller under contract with Blackhawk Network is required to wait for payment from Blackhawk Network which may occur weeks or even months after a gift card has been activated.

Another problem associated with existing third party gift card distribution systems is that they do not allow for peer-to-peer gift card transaction routing or processing. All gift card activation, redemption, voiding, or other transactions are directed to the gift card distribution aggregator. As a result, the processing and settlement of gift card transactions may be delayed, and the terms associated with gift card transaction processing are controlled by the aggregator, rather than the provider or the seller.

Accordingly, in light of these difficulties associated with conventional third party gift card distribution, there exists a need for methods, systems, and computer readable media for peer-to-peer third party gift card distribution and peer-to-peer transaction routing therefor.

SUMMARY

The subject matter described herein includes methods, systems, and computer readable media for peer-to-peer third party distribution of gift cards and peer-to-peer transaction routing therefor. According to one method, the subject matter described herein includes providing a peer-to-peer gift card transaction router and a peer-to-peer gift card transaction database that are configurable to facilitate peer-to-peer transaction processing for gift cards issued by a gift card provider and distributed by a third party seller where the gift card provider and the third party seller negotiate terms of gift card distribution directly with each other and enter an agreement regarding the distribution of and transaction processing for gift cards by the gift card provider and distributed by the third party seller. The method includes creating a record in the database corresponding to the agreement between the third party seller and the gift card provider. In response to a gift card transaction by the third party seller for a gift card issued by the gift card provider, the method includes, at the peer-to-peer gift card transaction router, receiving a gift card transaction message from the third party seller. The method includes accessing the database using information in the gift card gift card transaction message and locating a record in the database corresponding to the agreement between the gift card provider and the third party seller. The method further includes, using information in the record, communicating notification of the gift card transaction to the gift card provider.

The subject matter described herein for peer-to-peer third party distribution of gift cards may be implemented using a computer readable medium having stored thereon executable instructions that when executed by the processor of a computer performs steps. Exemplary computer readable media suitable for implementing the subject matter described herein includes chip memory devices, disk memory devices, and application specific integrated circuits. In addition, a computer readable medium that implements the subject matter described herein may be located on a single computing platform or may be distributed across multiple computing platforms.

BRIEF DESCRIPTION OF THE DRAWINGS

Preferred embodiments of the subject matter described herein will now be described with reference to the accompanying drawings of which.

DETAILED DESCRIPTION

The subject mater described herein includes methods, systems, and computer readable media for peer-to-peer third party gift card distribution. The methods and systems described herein allow gift cards to be distributed by third party sellers, i.e., sellers that are separate from gift card providers, where the providers and sellers negotiate directly with each other and enter into agreements regarding the distribution and activation of gift cards.

Figure 1:
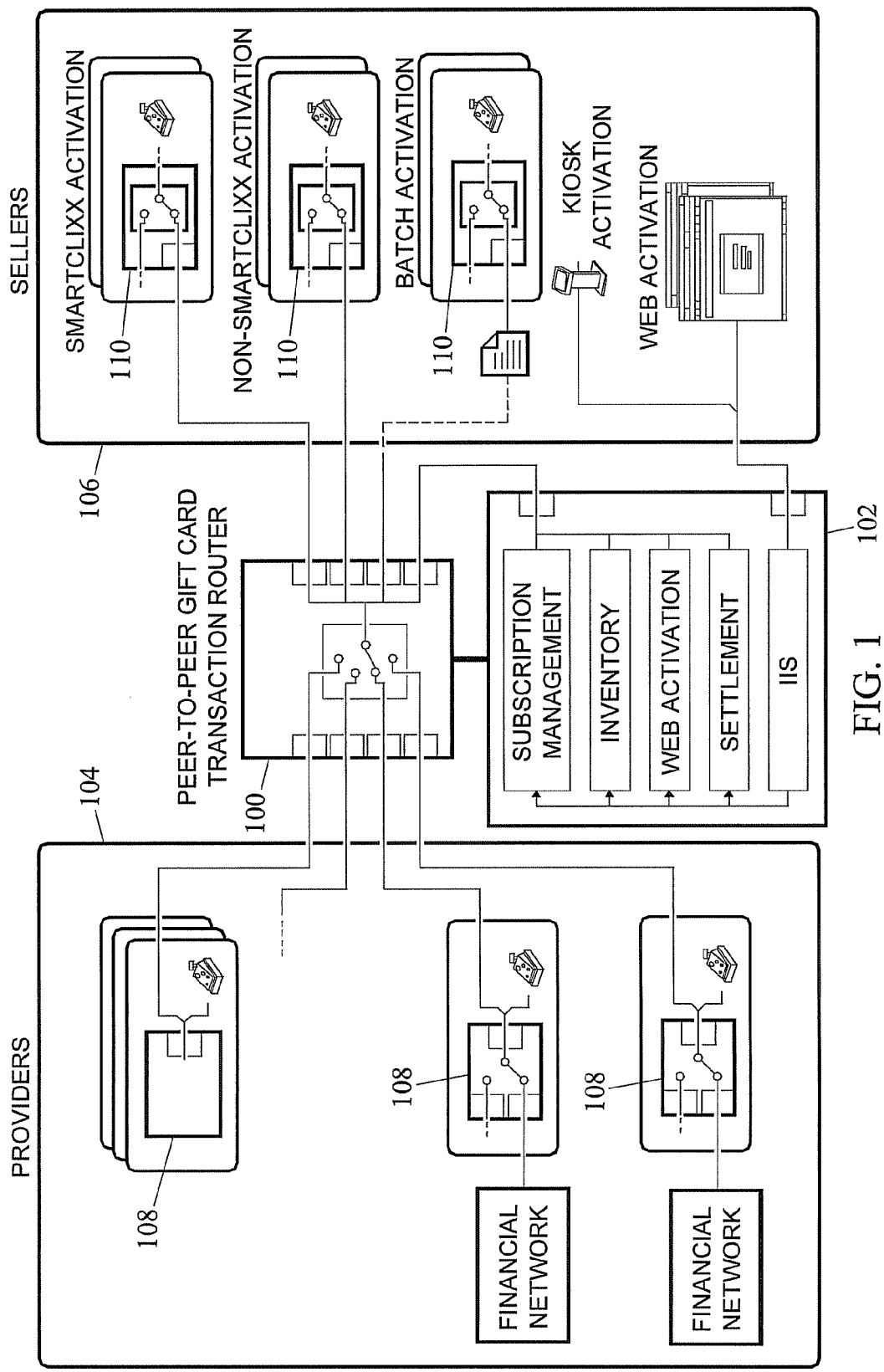
FIG. 1 is a block diagram of a peer-to-peer third party gift card distribution system according to an embodiment of the subject matter described herein.

FIG. 1 is a block diagram of an exemplary system for peer-to-peer third party distribution of gift cards according to an embodiment of the subject matter described herein. Referring to FIG. 1, the system includes a peer-to-peer gift card transaction router 100 and a peer-to-peer gift card transaction database 102. Peer-to-peer gift card transaction router 100 and database 102 are configurable to facilitate activation of gift cards issued by a gift card provider, such as any of gift card providers 104 to be distributed by a third party gift card seller, such as gift card sellers 106, where the gift card provider and the third party seller negotiate directly with each other and are in agreement regarding the distribution and activation of gift cards. For example, database 102 may have an associated web server that allows records corresponding to agreements between providers and sellers to be created, updated, and deleted. The system illustrated in FIG. 1 further includes provider gift card transaction nodes 108 and seller gift card transaction nodes 110. Provider gift card transaction nodes 108 and seller gift card transaction nodes 110 may be general purpose computing platforms that have processors and associated memory. The processors may be programmed to perform the steps described herein for gift card activation. Similarly, peer-to-peer gift card transaction router 100 may be a general purpose computing platform with one or more processors and associated memory for routing gift card activation transactions between providers 104 and sellers 106 and for accessing database 102 to effect gift card activation and inventory management.

Once an agreement is reached between a gift card provider and a gift card seller regarding terms of gift card distribution by the seller, a record is created in database 102 corresponding to the agreement between the third party seller and the gift card provider. The record may include network routing information so that gift card activation messages can be routed between the gift card provider and the gift card seller. The record may be indexed or accessible using a parameter, such as a seller and/or provider identifier in a gift card activation message.

When a gift card is activated by a gift card seller, an activation message is sent from the seller to peer-to-peer gift card transaction router 100. Peer-to-peer gift card transaction router 100 accesses database 102 and locates the record corresponding to the agreement. Using information in the record, peer-to-peer gift card transaction router 100 communicates notification of activation of the gift card to the gift card provider.

Using a system illustrated in FIG. 1, any gift card provider can negotiate directly with any gift card seller for gift card distribution and is not limited to a predefined group of gift card sellers that have agreements with the owner of the peer-to-peer gift card transaction router 100. In addition, settlement for a gift card activation can occur directly between providers 104 and sellers 106 without waiting for processing by a gift card distribution aggregator. For example, peer-to-peer gift card transaction router 100 may communicate as part of the activation, the monetary amount of the gift card to the gift card provider when the gift card is activated by a gift card seller. Since the gift card seller has already collected funds for the transaction, the gift card seller can then initiate payment to the gift card provider via an online payment service, such as SxPay web service to immediately settle with the gift card provider.

In addition to providing for direct negotiation between gift card providers and third party sellers and real time settlement, peer-to-peer gift card transaction router 100 and database 102 may provide inventory management for gift cards of a provider sold by a gift card seller. The inventory management system implemented by router 100 and database 102 may keep track of the number of gift cards for any gift card provider that are being sold by a gift card seller and automatically place orders with allocation per seller/store/register to maintain an inventory of gift cards at a particular seller. The orders may be global orders that reduce the cost of cards and the cost of order fulfillment. In addition, transaction router 100 and database 102 may provide both sellers and providers a real time inventory of gift cards. The inventory may be provided on a per card design, per seller, per store, etc.

Figure 2:
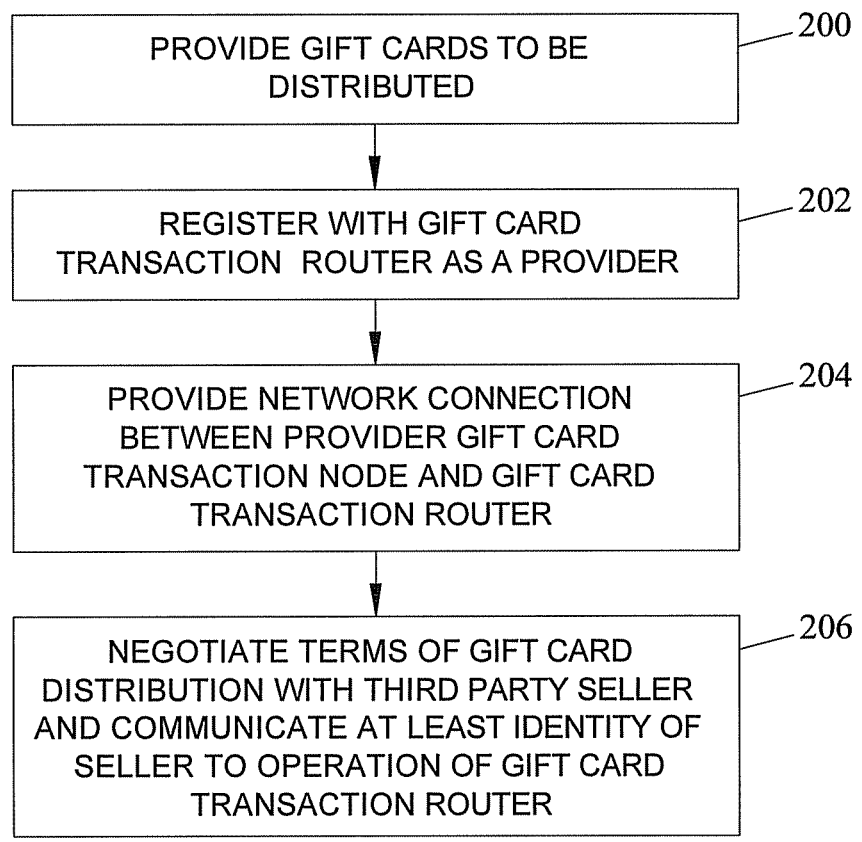
FIG. 2 is a flow diagram illustrating exemplary steps associated with gift card issuance according to an embodiment of the subject matter described herein.

In order for a gift card to be distributed using the peer-to-peer third party distribution system according to an embodiment of the subject matter described herein, a provider may issue gift cards or contract with a third party for issuance of gift cards. FIG. 2 illustrates exemplary steps that may be performed by a gift card provider in issuing gift cards and distributing the gift cards using the peer-to-peer third party gift card distribution system described herein. Referring to FIG. 2, in step 200, the gift card provider provides gift cards to be distributed. The gift cards may be conventional plastic cards or virtual cards that can be printed from a website. The gift card provider may physically produce the gift cards or may contract with a third party for production of the gift cards.

In step 202, the gift card provider registers with the operator of gift card transaction router 100 illustrated in FIG. 1 as a provider. The operator of gift card transaction router 100 may then start a record in database 102 corresponding to the provider.

In step 204, the provider provides a network connection between a provider gift card transaction node, such as one of nodes 108, and gift card transaction router 100. The network connection may be a secure Internet connection, such as an HTTPS connection. In step 206, the gift card provider negotiates the terms of gift card distribution with a third party seller and communicates at least the identity of the seller to the operator of gift card transaction router 100. The operator of gift card transaction router 100 then adds the identity of the seller to database 102 and creates a record corresponding to the agreement between the provider and the seller.

Figure 3:
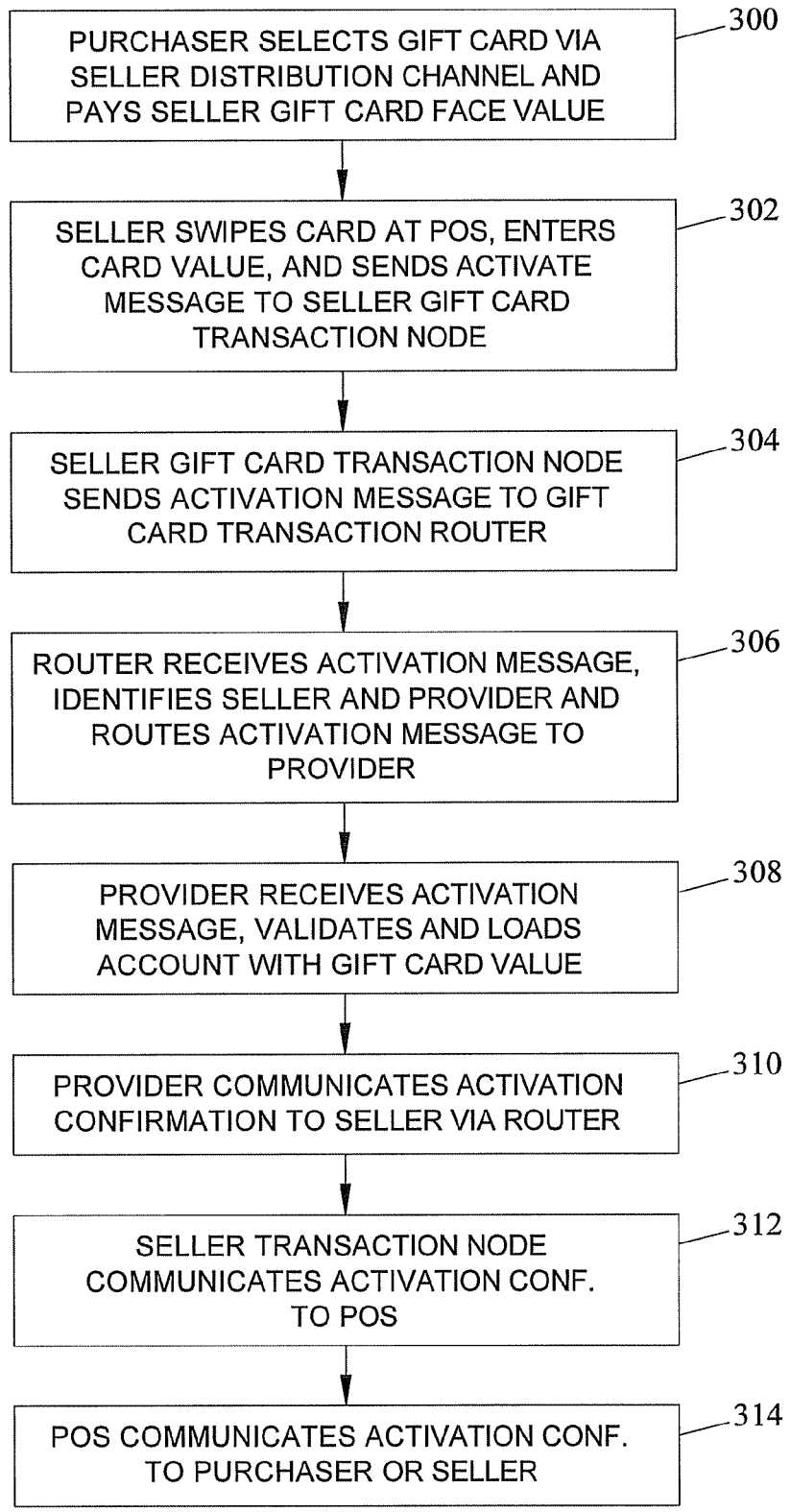
FIG. 3 is a flow diagram illustrating exemplary steps associated with gift card activation according to an embodiment of the subject matter described herein.

The operator of gift card transaction router 100 may then connect via the network with the provider, obtain a network connection to a gift card transaction node (such as one of nodes 110) at the seller, and connect to the gift card transaction node at the seller via that connection. Once both the provider and the seller are connected to transaction router 100 and a record is created in database 102, gift cards provided by a provider and sold by a seller can be activated. FIG. 3 illustrates exemplary steps that may be performed in activating a gift card using the peer-to-peer third party distribution system according to an embodiment of the subject matter described herein. Referring to FIG. 3, in step 300, a purchaser selects a gift card via a seller distribution channel and pays the seller for the gift card face value. In this example, it is assumed that the gift card is a physical plastic or paper gift card. Accordingly, in step 302, the seller swipes the card at the point of sale, enters the card value, and sends an activate message to the seller gift card transaction node. In step 304, the seller gift card transaction node sends the activation message to gift card transaction router 100. In step 306, gift card transaction router 100 receives the activation message, identifies the seller and provider, and routes the activation message to the provider. Step 306 may be performed by accessing database 102 to locate the provider corresponding to information (such as the provider identifier) in the activation message. In step 308, the provider receives the activation message, validates the transaction, and loads the account corresponding to the gift card with a gift card value. In step 310, the provider communicates activation confirmation to the seller via the router. In step 312, the seller transaction node communicates activation confirmation to the point of sale. In step 314, the point of sale communicates activation confirmation to the purchaser or the seller. For example, activation confirmation may be displayed to the seller via a seller point of sale terminal or to the purchaser via the purchaser point of sale terminal.

The subject matter described herein is not limited to peer-to-peer transaction routing for activation transactions. The steps described above for peer-to-peer transaction routing for activation transactions can be used for any suitable gift card transaction, including redemption transactions and other gift card transactions. The following example illustrates exemplary steps that may be performed for peer-to-peer gift card redemption when the gift card is sold by a third party seller. In the example below, an affiliate refers a party who has an entry in gift card transaction database 102 for peer-to-peer gift card transaction routing by gift card transaction router 100.

Gift card transaction router 100 allows the redemption of gift cards at 3rd party retailers. For example a Nike card purchased in a Nike store or through a third party seller can use the Nike card as form of payment for Nike merchandise in any affiliate store that carries Nike merchandise.

For such a redemption transaction, the following steps occur:
1. Purchaser selects any affiliate third party retailer that carries merchandise covered by gift card.
2. Purchaser selects merchandise.
3. Purchaser uses the gift card as form of payment to pay for the selected merchandise.
4. Seller swipes card at the seller's POS, enters the amount, and redeem transaction is sent to the seller's centralized payment switch, such as gift card transaction node 110 illustrated in FIG. 1.
5. The seller's switch, already programmed to send a specific provider BIN range to gift card transaction router 100, forwards a message associated with the redeem transaction to gift card transaction router 100.
6. Gift card transaction router 100 takes the redeem transaction and correspondingly routes it to the appropriate provider. For example, gift card transaction router 100 may extract the provider ID and the seller ID from the message and use that identifier to access database 102 to locate a record corresponding to the agreement between the seller and the provider and, from the record, to obtain routing instructions to route the transaction to the appropriate provider. Gift card transaction router 100 may then forward a message associated with the redeem transaction to the provider using the provider routing information located in database 102.
7. Provider receives the redeem transaction, determines if the card has already been loaded in the provider's gift card transaction database and has enough balance to cover the transaction, and performs other validation checks. If the transaction is deemed valid, then the account is charged with the specified amount adjusting accordingly the balance. Then the provider sends back a response to the seller via gift card transaction router 100.
8. The response is received by gift card transaction router 100, which in turn sends it back to the seller's switch, such as gift card transaction node 110.
9. The seller's switch receives the response and in turn sends it back to the originating POS.
10. Upon receipt of an approval at the seller POS, the clerk acknowledges the purchase to the purchaser, and hands the corresponding receipt.

This same transaction flow can be applied to: reloads, adjust increment/decrement, preauthorizations, balance inquiries, loyalty, all of the corresponding voids, or any other valid transaction type.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for peer-to-peer third party distribution of gift cards and peer-to-peer transaction routing therefor, the method comprising:
   providing a peer-to-peer gift card transaction router implemented using a computing platform and a peer-to-peer gift card transaction database that are configurable to facilitate peer-to-peer transaction processing for gift cards issued by a gift card provider and distributed by a third party seller where the gift card provider and the third party seller negotiate terms of gift card distribution directly with each other and enter an agreement regarding distribution of and transaction processing for gift cards issued by the gift card provider and distributed by the third party seller;
   creating a record in the database corresponding to the agreement between the third party seller and the gift card provider;
   in response to a gift card transaction by the third party seller for a gift card issued by the gift card provider, at the peer-to-peer gift card transaction router:
      receiving a gift card transaction message from the third party seller;
      accessing the database using information in the gift card transaction message and locating the record corresponding to the agreement between the third party seller and the gift card provider; and
      using information in the record, communicating notification of the gift card transaction to the gift card provider, wherein the gift card provider, the gift card seller, and an operator of the gift card transaction router and the database comprise separate entities.

2. The method of claim 1 wherein the gift card transaction router and the database are configured to facilitate transaction processing for gift cards issued by a plurality of different gift card providers and a plurality of different gift card sellers.

3. The method of claim 1 wherein the gift card transaction router and the database are configured to maintain an inventory of gift cards provided by the gift card provider to the third party seller and to update the inventory in response to gift card activations.

4. The method of claim 1 wherein the notification of the gift card transaction communicated to the gift card provider includes a face value of the gift card.

5. The method of claim 1 wherein settlement for the gift card transaction occurs between the gift card provider and the gift card seller without involving a gift card distribution aggregator.

6. The method of claim 1 wherein communicating notification of the gift card transaction to the gift card provider includes routing the gift card transaction message to the gift card provider.

7. The method of claim 6 wherein routing the gift card transaction message to the gift card provider includes routing the gift card transaction message to a gift card transaction node operated by the gift card provider.

8. The method of claim 1 wherein the gift card transaction comprises an activation and wherein the method further comprises, at the gift card provider, in response to receiving notification of the activation, loading an account with a value for the gift card.

9. The method of claim 1 wherein the gift card transaction comprises an activation and wherein the method further comprises, at the gift card provider, in response to receiving notification of the activation, validating the activation and sending confirmation of the activation to the third party gift card seller.

10. The method of claim 1 wherein the gift card transaction comprises a redemption of the gift card by the third party seller.

11. The method of claim 1 wherein the gift card transaction comprises one of: a reload transaction, an adjust increment/decrement transaction, a preauthorization transaction, a balance inquiry transaction, a loyalty transaction, and a void transaction.

12. A system for peer-to-peer third party distribution of gift cards and peer-to-peer transaction routing therefor, the system comprising:
    a peer-to-peer gift card transaction router and a peer-to-peer gift card transaction database that are configurable to facilitate peer-to-peer transaction processing for gift cards issued by a gift card provider and distributed by a third party seller where the gift card provider and the third party seller negotiate terms of gift card distribution directly with each other and enter an agreement regarding distribution of and transaction processing for gift cards issued by the gift card provider and distributed by the third party seller;
    wherein the database includes a record corresponding to the agreement between the third party seller and the gift card provider;
    wherein, in response to a gift card transaction by the third party seller for a gift card issued by the gift card provider, the peer-to-peer gift card transaction router is configured to:
        receive gift card transaction message from the third party seller;
        access the database using information in the gift card transaction message and locate the record corresponding to the agreement between the third party seller and the gift card provider; and
        using information in the record, communicate notification of the gift card transaction to the gift card provider, wherein the gift card provider, the gift card seller, and an operator of the gift card transaction router and the database comprise separate entities.

13. The system of claim 12 wherein the gift card transaction router and the database are configured to facilitate processing of gift cards issued by a plurality of different gift card providers and a plurality of different gift card sellers.

14. The system of claim 12 wherein the gift card transaction router and the database are configured to maintain an inventory of gift cards provided by the gift card provider to the third party seller and to update the inventory in response to gift card activations.

15. The system of claim 12 wherein the notification of the gift card transaction communicated to the gift card provider includes a face value of the gift card.

16. The system of claim 12 wherein settlement for the gift card transaction occurs between the gift card provider and the gift card seller without involving a gift card distribution aggregator.

17. The system of claim 12 wherein communicating notification of the gift card transaction to the gift card provider includes routing the gift card transaction message to the gift card provider.

18. The system of claim 17 wherein routing the gift card transaction message to the gift card provider includes routing the message to a gift card transaction node operated by the gift card provider.

19. The system of claim 12 wherein the gift card transaction comprises an activation and wherein the gift card provider, in response to receiving notification of the activation, loading an account with a value for the gift card.

20. The system of claim 12 wherein the gift card transaction comprises an activation and wherein the gift card provider is configured to validate the activation and send confirmation of the activation to the third party gift card seller.

21. The system of claim 12 wherein the gift card transaction comprises a redemption of the gift card by the third party seller.

22. The system of claim 12 wherein the gift card transaction comprises one of: a reload transaction, an adjust increment/decrement transaction, a preauthorization transaction, a balance inquiry transaction, a loyalty transaction, and a void transaction.

23. A computer readable medium having stored thereon instructions that when executed by the processor of a computer performs steps comprising:
    providing a peer-to-peer gift card transaction router and a peer-to-peer gift card transaction database that are configurable to facilitate peer-to-peer transaction processing for gift cards issued by a gift card provider and distributed by a third party seller where the gift card provider and the third party seller negotiate terms of gift card distribution directly with each other and enter an agreement regarding distribution of and transaction processing for gift cards issued by the gift card provider and distributed by the third party seller;
    creating a record in the database corresponding to the agreement between the third party seller and the gift card provider;
    in response to a gift card transaction by the third party seller for a gift card issued by the gift card provider, at the peer-to-peer gift card transaction router:
        receiving a gift card transaction message from the third party seller;
        accessing the database using information in the gift card transaction message and locating the record corresponding to the agreement between the third party seller and the gift card provider; and using information in the record, communicating notification of the gift card transaction to the gift card provider, wherein the gift card provider, the gift card seller, and an operator of the gift card transaction router and the database comprise separate entities.

\* \* \* \* \*